United States Patent
Ward

(10) Patent No.: US 7,725,774 B2
(45) Date of Patent: *May 25, 2010

(54) METHODS, SYSTEMS, AND MEDIA TO CORRELATE ERRORS ASSOCIATED WITH A CLUSTER

(75) Inventor: Calvin Dean Ward, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 129 days.

This patent is subject to a terminal disclaimer.

(21) Appl. No.: 11/833,872

(22) Filed: Aug. 3, 2007

(65) Prior Publication Data
US 2008/0320338 A1    Dec. 25, 2008

Related U.S. Application Data

(63) Continuation of application No. 10/438,391, filed on May 15, 2003, now Pat. No. 7,287,193.

(51) Int. Cl.
*G06F 11/00* (2006.01)
(52) U.S. Cl. .............. 714/43; 714/4; 370/216
(58) Field of Classification Search ............ 714/4, 714/43; 370/216; 709/223–226
See application file for complete search history.

(56) References Cited

U.S. PATENT DOCUMENTS

| | | | |
|---|---|---|---|
| 6,061,723 A | 5/2000 | Walker et al. | |
| 6,954,882 B2 * | 10/2005 | Beer et al. | 714/43 |
| 6,978,302 B1 | 12/2005 | Chisholm et al. | |
| 7,103,807 B2 | 9/2006 | Bosa et al. | |
| 7,139,925 B2 | 11/2006 | Dinker et al. | |
| 7,206,836 B2 | 4/2007 | Dinker et al. | |
| 7,237,138 B2 | 6/2007 | Greenwald et al. | |
| 7,239,605 B2 | 7/2007 | Dinker et al. | |
| 7,287,193 B2 | 10/2007 | Ward | |
| 2002/0116669 A1 | 8/2002 | Jain | |
| 2002/0133756 A1 | 9/2002 | Jain | |
| 2003/0158933 A1 | 8/2003 | Smith | |

* cited by examiner

*Primary Examiner*—Robert Beausoliel
*Assistant Examiner*—Philip Guyton
(74) *Attorney, Agent, or Firm*—Patterson & Sheridan, LLP; James R. Nock

(57) ABSTRACT

Methods, systems, and media for correlating error events of a cluster are disclosed. Embodiments may identify systems of a cluster potentially impacted by an error and identify one or more error events associated with those systems. Then, embodiments may select one of the identified error events based upon data associated with the identified error event, disregarding other identified error events generated for the same error or errors symptomatic of the error, to report the error to a maintenance provider via a single error event. Many embodiments may identify one or more error events potentially resulting from the same error by identifying error events within a specified time period of the event that triggered the correlation. Several embodiments correlate the error events in an environment that is substantially independent of the cluster. Further embodiments obtain data that describes system interconnections of the cluster and generate a topology based upon the data.

9 Claims, 4 Drawing Sheets

FIG. 3

CEC INDEX STRUCTURE ← 300

| CEC MTMS | LOOP NUMBER | I/O UNITS ON LOOP | LOOP SIBLING | POINTER TO LOOP MODEL NODE |
|---|---|---|---|---|

FIG. 4

LOOP MODEL NODE ← 400

| CEC MTMS | LOOP NUMBER | SIBLING LOOP NUMBER | LINK TO LOOP NODE FROM EVEN CEC PORT | LINK TO LOOP NODE FROM ODD CEC PORT |
|---|---|---|---|---|

METHODS, SYSTEMS, AND MEDIA TO CORRELATE ERRORS ASSOCIATED WITH A CLUSTER

CROSS-REFERENCE TO RELATED APPLICATIONS

This is a continuation of U.S. patent application Ser. No. 10/438,391 filed May 15, 2003, now U.S. Pat. No. 7,287,193 which is herein incorporated by reference.

BACKGROUND OF THE INVENTION

1. Field of the Invention

The present invention generally relates to the field of clusters of computer systems. More particularly, the present invention relates to methods, systems, and media for correlating error events associated with clusters.

2. Description of the Related Art

Growing demands for expandability, reliability, and flexibility with regards to processing power for computer systems has outdated traditional networked environments for many applications. As business use of computer systems grow, customers are becoming critically dependent on their information technology resources, demanding that these resources are always available. Outages can seriously impact business, causing lost revenue and lost business. For instance, depending upon the nature of the business, system downtime can range from thousands to millions of dollars.

Clusters offer the continuous availability required by many businesses. A cluster is a collection of one or more systems that work together to provide a unified computing environment. Clusters can be interconnected with high-speed loops such as local area network (LAN), Opticonnect, and asynchronous transfer mode (ATM) to provide high-speed communications and switchover for data and application resiliency. From the customer's perspective, clusters can operate as a single system while data and applications are actually distributed across multiple systems. Distribution of data and applications from system to system within the cluster is performed in a relatively transparent manner so planned and unplanned outages will not disrupt services provided to the customer.

Maintenance of clusters demands expeditious identification of errors. Accordingly, cluster management utilities on each system of the cluster monitor systems and loops for errors. In particular, systems have "heartbeat" monitors for monitoring for software and hardware errors, generating error events to describe errors, and forwarding the error events to the customer, and, in some cases to a maintenance provider such as IBM.

The independent generation of error events by multiple systems within clusters has created a new problem for the maintenance of clusters. More specifically, when more than one system identifies an error, multiple error events are generated by the systems and reported to the maintenance provider. Moreover, an error can affect systems of the cluster in different ways, so each system reports the error based upon the affect the error has on the reporting system, creating a multitude of error events that appear to be independent. For example, an error that opens the communication loop between systems of a cluster may be reported by each system connected to the loop. This problem is exacerbated when the maintenance provider is not an administrator of the cluster and, thus, the maintenance provider may not be intimately aware of the topology, or, at the extreme, the maintenance provider may not be aware that the systems are connected to a cluster. Further, in the event of a catastrophic error or site error, systems at the site of the error or in the immediate vicinity of the error may be unable to forward error events to the maintenance provider.

Receipt of error events that appear to be independent, complicates repair actions. The different symptoms reported can lead to dispatch of multiple potential replacement parts and performance of complicated tasks by the service technicians. Current solutions involve drafting service procedures that instruct service technicians to look at the errors reported on all the systems of the same cluster. The service procedures conservatively attempt to identify the actual source of an error without eliminating independent errors, based upon a generic model of a cluster that fails to fully account for differences associated with specific cluster configurations designed by or for different customers. Thus, to avoid elimination of independent errors, maintenance providers may have to address multiple error events that result from the same error.

SUMMARY OF THE INVENTION

Embodiments of the invention generally provide methods, systems, and media for correlating error events associated with clusters. One embodiment provides a method for correlating error events associated with clusters. The method generally includes identifying systems of the cluster potentially impacted by an error based upon a topology of the cluster; identifying an error event associated with the systems, from the error events; and selecting the error event based upon error identification data associated with the error event, to report the error to a maintenance provider.

Another embodiment provides an apparatus for correlating error events associated with clusters. The apparatus may include a system identifier coupled with the cluster to identify systems of the cluster potentially impacted by an error based upon a topology of the cluster; an event identifier coupled with the system identifier to identify an error event associated with the systems, from the error events; and an event selector coupled with the event identifier to select the error event based upon error identification data associated with the error event, to report the error to a maintenance provider.

A further embodiment provides a computer readable medium containing a program which, when executed, performs an operation. The operation may include identifying systems of a cluster potentially impacted by an error based upon a topology of the cluster; identifying an error event associated with the systems, from error events generated by the cluster; and selecting the error event based upon error identification data associated with the error event, to report the error to a maintenance provider.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 3-4 describe an embodiment of two data structures associated to store a topology of a cluster.

DETAILED DESCRIPTION OF THE PREFERRED EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods, systems, and media for correlating error events of a cluster are contemplated. Embodiments may identify systems of a cluster potentially impacted by an error and identify one or more error events associated with those systems. Then, embodiments may select one of the identified error events based upon data associated with the identified error event and identify other identified error events that are generated for the same error or errors symptomatic of the error, to report the error to a maintenance provider via a single error event. Many embodiments may identify one or more error events potentially resulting from the same error by identifying error events within a specified time period of the event that triggered the correlation. Several embodiments correlate the error events in an environment that is substantially independent of the cluster to facilitate reporting errors in the event of catastrophic errors and site failures. Further embodiments also obtain data that describes system interconnections of the cluster from each system of the cluster and generate a topology for the cluster based upon the data.

Figure 1:
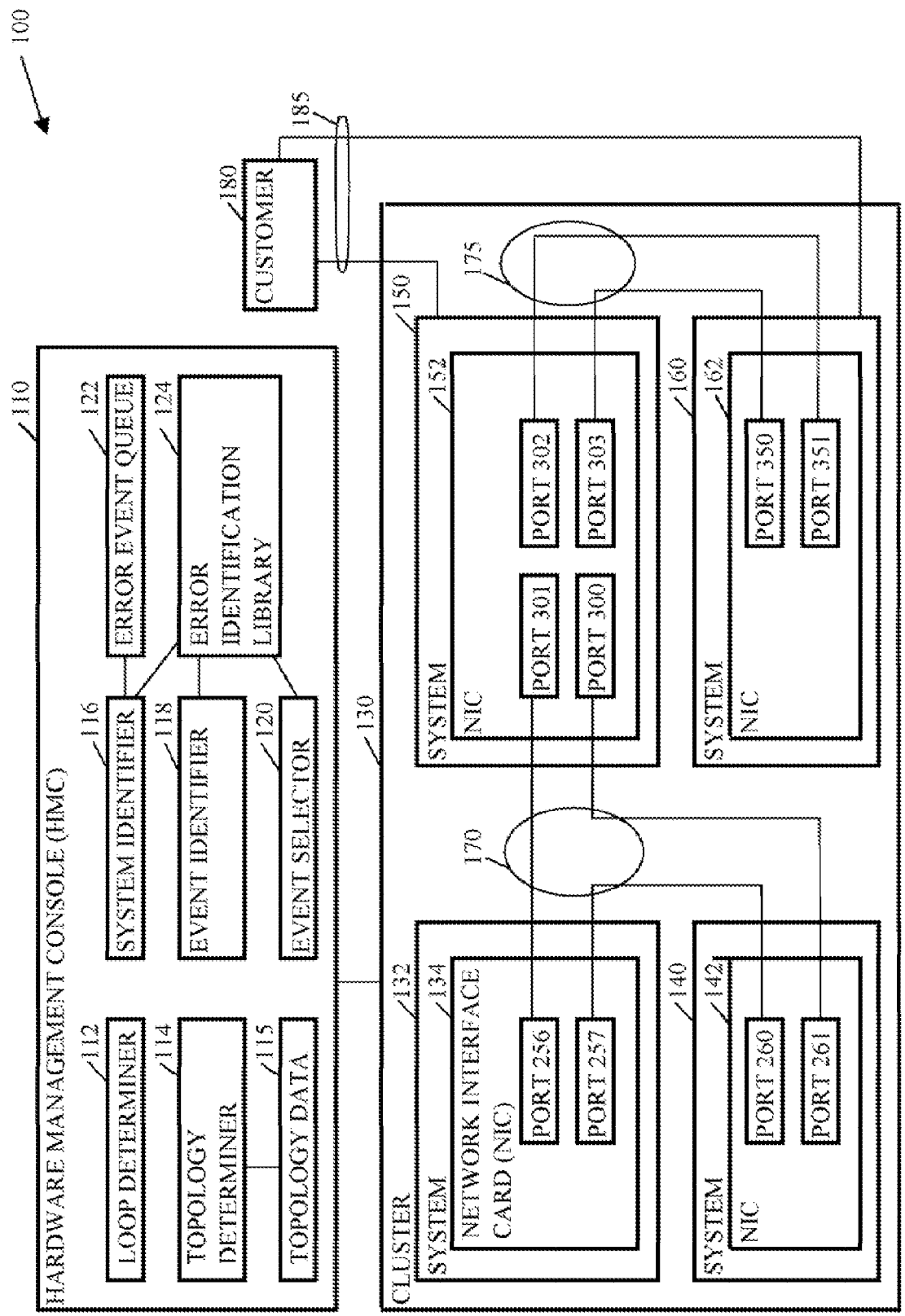
FIG. 1 is an embodiment of system including a cluster having a hardware master console (HMC) for correlating error events associated with the cluster.

Turning now to the drawings, FIG. 1 depicts an embodiment of a system 100 for correlating error events of a cluster. System 100 comprises a hardware management console (HMC) 110, a cluster 130, and a customer 180. HMC 110 is hardware like a notebook computer that may provide access for a system operator for a server like a system administrator to manage systems of cluster 130. In the present embodiment, HMC 110 provides an environment substantially independent of the cluster to receive and correlate error events from the systems of cluster 130 like systems 132, 140, 150, and 160.

In one embodiment, HMC 110 is coupled directly with a system of cluster 130 like system 132 via a dedicated Ethernet connection. In other embodiments, HMC 110 may couple with one or more systems of cluster 130 via a network relay such as a hub, switch, or router.

HMC 110 includes a loop determiner 112, a topology determiner 114, topology data 115, a system identifier 116, an event identifier 118, an event selector 120, an error event queue 122, and an error identification library 124. Loop determiner 112 may obtain loop data from the systems of cluster 130 to describe an interconnection between the systems and cluster 130. In particular, loop determiner 112 may receive a loop designation from systems of cluster 130 to identify a loop of cluster 130 such as a port number of a network interface controller (NIC) and a system designation to identify the system coupled with the loop. For example loop determiner 112 may receive loop data from system 132 of cluster 130 indicating that port 256 of NIC 134 is coupled with port 301 of NIC 152 for system 150. System 150 may be identified by a designation that is unique within cluster 130 such as the model type and model serial number (MTMS) of system 150. In many embodiments, loop determiner 112 receives loop data from each system of cluster 130 to describe the systems and ports related to the loops of cluster 130 like loops 170 and 175.

Upon receipt of the loop data for cluster 130, topology determiner 114 determines a topology for cluster 130. Topology determiner 114 may compare the types and model numbers of the hardware of cluster 130 as described by the loop data received from each system, to determine the interconnections of each loop of cluster 130. Then, topology determiner 114 stores the loop data in topology data 115, describing the relationships between systems associated with loops 170 and 175. For example, data structure 115 may store the loop data in a structure describing the loops and systems that couple with system 150 along with the corresponding ports for system 150. In many embodiments, topology data 115 also includes pointers relating each port of loops 170 and 175 with adjacent ports 256, 261, 350, and 351 of systems 132, 140, and 160.

In several embodiments, data structure 115 includes entries to relate sibling loops. Sibling loops are loops that share the same NIC like loops 170 and 175. Both loop 170 and 175 couple with NIC 152. Maintaining information to describe sibling loops can facilitate identification of error events related to a hardware or software error recognized by both loops as a result of the sibling relationship. For example, a failure associated with NIC 152 may be recognized by system 150 and systems 132, 140, and 160 because these systems are coupled with NIC 152. In response to the failure, systems 132, 140, 150, and 160 may each initiate one or more error events. Description of the sibling relationships in topology data 115 facilitates a determination that these error events are related. In alternative embodiments, hardware other than HMC 110 may be used to correlate error events. The other hardware may be part of the cluster, or advantageously independent of the cluster like HMC 110, since an independent environment may continue to facilitate correlation despite a catastrophic error or site error.

System identifier 116 may couple with topology data 115 to identify systems of cluster 130 potentially impacted by an error, based upon a topology of cluster 130. In particular, system identifier 116 monitors error event queue 122 for receipt of error events. When one or more error events are received from cluster 130, the first error event received by error event queue 122 is identified as a trigger error event. The trigger error event initiates a correlation process. Each error event in error queue 122 acts as a trigger error event unless the error event is marked to indicate that the error event has already been correlated.

System identifier 116, in response to the initiation of the correlation process, identifies systems of cluster 130 that may generate an error event based upon the error associated with the trigger error event. For example, when the trigger error event is associated with a cyclical redundancy error (CRC), between systems of cluster 132 like a clockwise path between port 256 and port 301, system identifier 116 searches topology data 115 to determine systems coupled with loop 170 and builds a list of systems associated with loop 170, e.g., systems 132, 150, and 160.

Event identifier 118 may couple with system identifier 116 to identify an error event associated with the potentially impacted systems identified by system identifier 116, from the error events in error event queue 122. More specifically, event identifier 118 compares error identification data of error events listed in error event queue 122 to the potentially impacted systems to determine whether the error events may be related to the trigger error event. Error identification data may include an error identification code identifying the type of error perceived by a reporting system, the MTMS of the reporting system, the port number(s) associated with the error, a NIC associated with the error, and a description of the events as seen by the reporting system that caused the reporting system to report the error event. For instance, a communication-terminating event may include a NIC identification, a port number, and a system identification along with data describing attempt(s) to communicate via the NIC or a port of the NIC. System identifier 116 identifies systems coupled with the NIC or the port of the NIC and event identifier 118 searches error event queue 122 to find error events associated with the identified systems.

Rather than identifying every error associated with the potentially impacted systems as identified by system identifier 116, in several embodiments, event identifier 118 may identify the error events that describe potentially related occurrences. Thus, when the trigger error event involves the termination of a communication path of a loop, error events associated with a communications failure on the same loop may be identified. For example, port 300 of system 150 may have a power failure, preventing communication between port 261 and port 300. A first error event may be generated by system 150 describing the error as a failure of NIC 152. A second event may be generated by system 140 describing an open communication path between port 261 and port 300. When the first event is the trigger error event, event identifier 118 identifies the second error event as a related error since the both errors are associated with an open communication path of loop 170.

Event selector 120 may couple with event identifier 118 to select an error event based upon the error identification data associated with the error event. More specifically, event selector 120 may select the error event from the identified error events, that describes the actual error in more detail. For example, a power failure in NIC 142 causes a loss of communication between port 260 of system 140 and port 257 of system 134. System 152 may generate an error event that describes an error in clockwise communication around loop 170. System 134 may generate an error event describing an open communications path between port 257 and port 260. And system 140 may generate an error event describing a power failure for port 260. Event identifier 118 identifies the errors as related and event selector 120 determines that the error event describing a power failure for port 260 is a more specific definition of the error involved with loop 170 so event selector 120 selects the error event generated by system 140. In many embodiments, the selected error event is forwarded to the maintenance provider to represent the error and the other related events are marked as "processed" so that they are not treated as trigger error events in a later error event correlation process. In other embodiments, the other related error events are discarded or removed from error event queue 122, leaving error events that were not identified as related in error event queue 122 for a later correlation process.

Error event queue 122 may include a first in, first out (FIFO) queue that receives error events generated by cluster 130. In some embodiments, systems of cluster 130 forward error events describing software and/or hardware errors that may cause high-speed loop (HSL) hardware errors, or remote input/output (RIO) hardware errors, like errors associated with loops 170 and 175 to be detected by one or more systems of cluster 130. The software and/or hardware errors may include errors associated with loops of cluster 130 such as power failures, cable failures, slow communication, open loop, NIC failures, remote system failures, abnormal clustering disconnect failures in a remote system, abnormal clustering disconnect failures in a local partition, platform terminating conditions, normal power down of a platform, communication terminating power faults, system terminating power faults, and the like.

Error identification library 124 may include memory having entries that associate error identifier codes of error identification data with errors. In some embodiments, errors may be associated with priorities based upon the type of error, to facilitate selection between types of errors by error selector 120 for determining the error to report to a maintenance provider when more than one error event describes the error. In further embodiments, error identification library 124 may include data associating error identifier codes with the types of systems that may be impacted. For example, an entry in error identification library 124 may include an error identifier code, an indication whether symptoms of the associated error might be detected by other systems of a cluster, whether symptoms of the associated error might be detected by systems on other loops of the cluster, and/or whether another system may detect the same error and generate an error event having the same error identifier code. Such associations with error identifier codes can narrow searches through topology data 115 for identification of impacted systems by system identifier 116, and facilitate identification of related error events by event identifier 118.

Cluster 130 may provide data and application resiliency to customer 180 by maintaining backups of data in separate systems such as by mirroring drives and journaling, as well as by running applications on more than one system and maintaining a job state for the application on the separate systems. Cluster 130 includes systems 132, 140, 150, and 160 and loops 170 and 175. Systems 132, 140, 150, and 160 provide processing power and data storage to run applications for customer 180 and to store data for customer 180. For example, systems 132, 140, 150, and 160 may include servers like IBM eServer pSeries servers, iSeries servers, RS/6000, or the like having an operating system that supports clustering like OS/400 or AIX, although systems 132, 140, 150, and 160 may include any combination of compatible servers and operating systems.

Operating systems may include clustering software that generates error events upon detection of an error and directs the error events to HMC 110 rather than reporting the error events directly to a customer or maintenance provider. Further, the clustering software includes code to dynamically maintain loop data to describe the cluster systems and hardware from the perspective of each system. For instance, operating software of system 132 may maintain loop data to describe that port 256 of NIC 134 is coupled with port 301 of system 150, port 257 is coupled with port 260 of system 140, ports 256 and 257 are associated with NIC 134, and ports 256 and 257 couple with the same loop.

Systems 132, 140, 150, and 160 also include hardware to couple with an HSL like Opticonnect, LAN, and ATM. In particular, systems 132, 140, 150, and 160 include NICs 134, 142, 152, and 162 to couple with loops 170 and 175. Loops 170 and 175 may comprise fiber optic cables, copper cables, or any other communication medium compatible with NICs 134, 142, 152, and 162.

Customer 180 may include one or more computer systems like notebooks or desktop computers. Customer 180 may couple with cluster 130 via a LAN or WAN like loop 185. In some embodiments, customer 180 couples with a relay device such as a hub or switch that connects customer to more than system of cluster 130.

Figure 2:
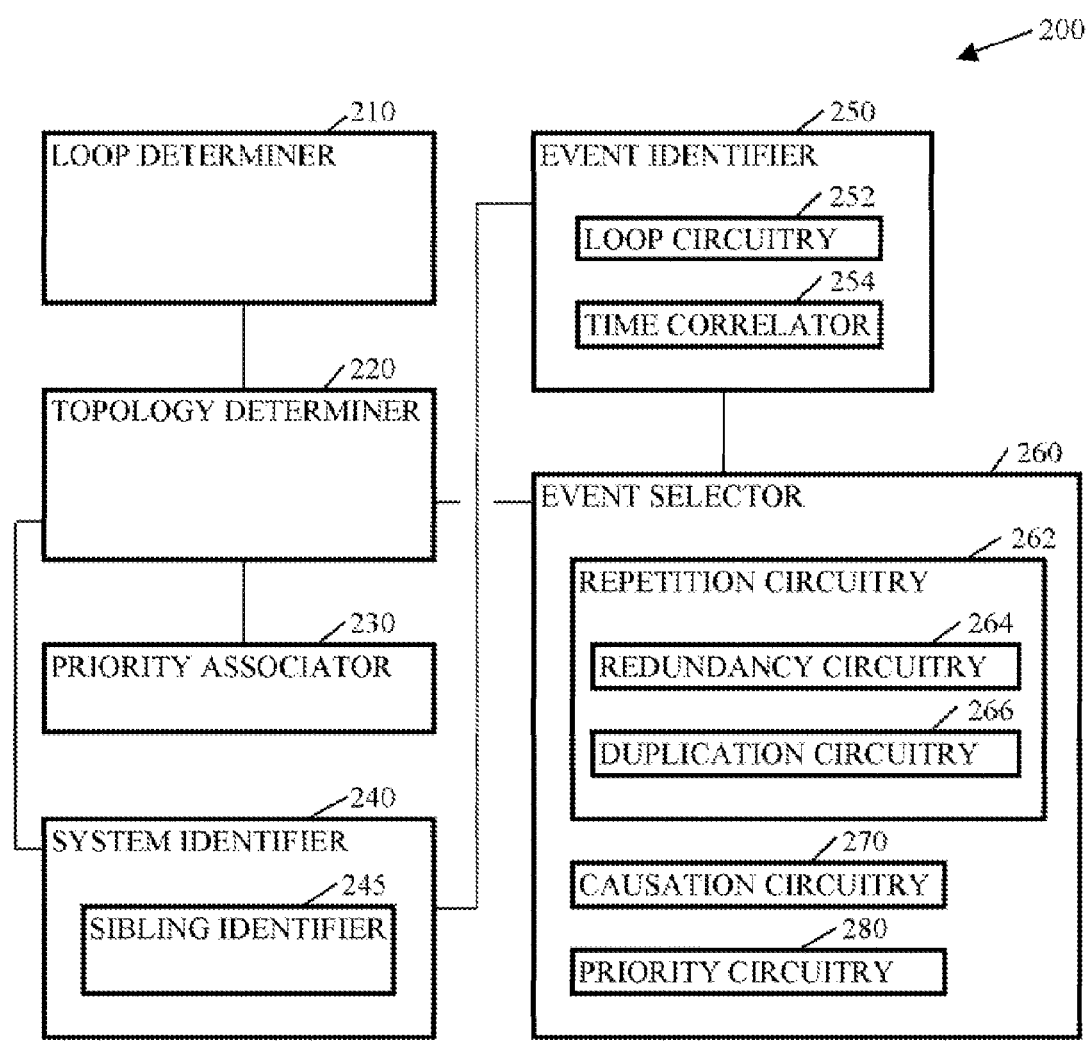
FIG. 2 is an embodiment of an apparatus having hardware and firmware for correlating error events associated with the cluster.

Referring now to FIG. 2, there is shown an embodiment of an apparatus 200 to correlate error events associated with a cluster. Apparatus 200 may include a specific purpose system like a state machines or specific purpose processors, a general purpose machine configured by software to execute aspects of the invention, combinations of the two, or the like. In particular, apparatus 200 may receive more than one error event, determine whether other error events resulted from detection of the same error, and identify one error event of the related error events to report the error to a maintenance provider. Apparatus 200 includes loop determiner 210, topology determiner 220, priority associator 230, system identifier 240, event identifier 250, and event selector 260. Loop determiner 210 may receive loop data from the systems of the cluster to describe an interconnection between the systems and the cluster. For example, loop determiner 210 may forward a request to each system of the cluster indicating that loop determiner 210 is ready to receive loop data. Each system may respond to the request with loop data including the system designation like the MTMS for the system and one or more loop designations with corresponding hardware model and/or serial numbers.

Topology determiner 220 may couple with loop identifier 210 to determine the topology for the cluster based upon the loop data. For instance, topology determiner 220 may receive the loop data and populate one or more data structures to describe the topology of the cluster. Then, topology determiner 220 compares the MTMSs of the systems and the hardware models and/or serial numbers of NIC cards to describe interconnections between the systems of the cluster with pointers. For example, each system entry in a data structure may relate the system to a loop coupled with the system. When loop data describes a first port of a first system as coupled with a second port of a second system, a pointer in the entry for the first system associates an entry for a loop of the first system with an entry for the loop of the second system, describing an interconnection of the loop between the two systems. A similar pointer may be associated with the entry for the second system to identify the same interconnection. Thus, when an error event is associated with the loop of the first system, the entry describing the loop for the first system points to the second system and implies an adjacency between the first system and the second system. Further, when the loop of the first system is associated with the same NIC as a second loop for the first system, a pointer associates the two loops of the first system with the NIC to identify the loop and the second loop as sibling loops.

Priority associator 230 may prioritize error identifier codes for error events based upon the type and/or severity of the error to facilitate selection of an error event to send to a maintenance provider. For instance, a first error identifier code may identify a system terminating error and a second error identifier code may identify an abnormal disconnect of a remote system of the cluster. The system terminating error describes an error that terminates communications with other systems of the cluster, whereas the abnormal disconnect of a remote system describes an inability by one system of the cluster to communicate with a remote system. When both errors are associated with a failure of communication on the same system, the abnormal disconnect error has a lower priority than the system terminating error because the error event associated with the system terminating error is generated by the system that failed and therefore may provide more detail about the failure to the maintenance provider. In alternative embodiments, a lower priority code may be assigned to indicate a more descriptive or more severe error.

System identifier 240 may couple with topology determiner 220 to identify systems of the cluster potentially impacted by an error described by a trigger error event. In particular, system identifier 240 accesses an entry in the data structure maintaining the cluster's topology, for the system and loop identified by the error event. Based upon pointers associated with the entry, system identifier 240 determines which systems may have detected the error and generated an error event.

System identifier 240 may include a sibling identifier 245 to identify the systems coupled with sibling loops of the cluster. In particular, system identifier 240 searches the topology of the cluster to find systems coupled with sibling loops that may have detected the error and generated an error event. For example, when the error described by the trigger error event indicates a failure of a NIC and the NIC is associated with more than one loop, sibling identifier 245 identifies the systems coupled with the sibling loop because the systems coupled with the sibling loop may detect at least a failure in communication with the system having the NIC that failed.

Event identifier 250 may couple with system identifier 240 to identify an error event associated with the systems, from the error events. Based upon the systems identified by system identifier 240, event identifier 250 searches a list of one or more error events generated by the systems of a cluster to identify the error events that were generated by the systems identified by system identifier 240.

Event identifier 250 includes loop circuitry 252 and time correlator 254. Loop circuitry 252 may identify error events that associate the same loop with a source of the error described by the trigger event. For instance, when the trigger error event describes an error associated with a first loop of the cluster, loop circuitry 252 identifies each error event generated that describes an error on the loop since those error events may have been caused by the same error.

Time correlator 254 may identify error events received within a time period of receipt of the trigger error event as potentially related error events. In other words, time correlator 254 reduces the number of error events to correlate by setting a time period, or latency window, such as ten seconds, within which error events related to the same error should be received. For example, when one or more error events are received from the cluster, a timer is initiated for each error event at their corresponding times of receipt. Error events received within that latency window are then identified as potentially related error events and other error events received outside of that latency window are determined to be unrelated to the trigger error event.

Event selector 260 may couple with event identifier 250 to select an error event based upon error identification data associated with the error event, to report the error to a maintenance provider. Event selector 260 may include repetition circuitry 262, causation circuitry 270, and priority circuitry 280. Repetition circuitry 262 reviews the events identified by event identifier 250 to identify error events that have error identification data describing the same error as the trigger event. For instance, repetitious error events may include error events describing the same error that the trigger error event describes, although the repetitious error events may describe the error with the same, higher, or lower detail, depending upon the location of the system within the cluster with respect to the error.

Repetition circuitry 262 includes redundancy circuitry 264 to identify redundant error events generated by the same system that generated the trigger error event. Redundant error events have error identification data that describes the same loop and the same error identifier code although the criteria described for detecting the error may be different. For example, a system may detect slow communications when communicating clockwise around a loop of a cluster. When the system decides that clockwise communication is too slow, the system may direct communication in a counter-clockwise direction and generate an error event indicating that communication in a clockwise direction around that loop is slow. Moments later, the system may determine that communication around the same loop in a counter-clockwise direction is too slow and generate another error event indicating that communications in a counter-clockwise direction around that loop is slow. When the error events were generated with the latency window determined by time correlator 254, redundancy circuitry 264 identifies the second error event as a redundant or repetitious error event and marks the second error event as "processed". Marking the second error event as processed instructs apparatus 200 to disregard the error event, preventing that error event from being a trigger error event and from being a "call home candidate."

Repetition circuitry 262 includes duplication circuitry 264 to identify duplicate error events generated by a different system than the system that generated the trigger error event. Duplicate error events include error identification data that describes the same error identifier code as the trigger event and indicates the same error. For example, when a cable is cut, terminating communications on a loop between two systems of a cluster, a first system coupled with the loop may detect the error and generate a first error event, the trigger error event. Then the second system coupled with the loop via the cut cable may generate a second error event. Both error events describe the same loop and identify the same error identifier code but the errors are generated by different systems. The second error event is marked as "processed."

Causation circuitry 270 may identify error events that have error identification data describing a symptom of the error identified by the trigger event. In other words, an effect of the error described by the trigger error event may be detected as an error by systems of the cluster or the effect of the error described by the trigger event may cause secondary errors detected by systems of the cluster. Thus, a repair of the error described by the trigger error event may also solve the symptoms of the error identified by the trigger event. For example, a software failure in a first system of the cluster causes the first system to lose communication with the cluster and to generate a first error event. Other systems coupled with each loop that couples with the first system generate error events to describe the failure of communication with the first system. The error events generated by the other systems result from the software failure described in the first error event so the error events generated by the other systems are identified by causation circuitry 270 and marked as "processed." Further, a normal power off error event of the first system may cause symptom error events in the other systems. In such cases, the other error events are marked as "processed," and, the normal power off error event is thus advantageously used to avoid unnecessary repair actions by the maintenance provider.

Priority circuitry 280 may identify error events having error identification data associated with the highest priority to disregard the lower priority error events, based upon the priorities established by priority associator 230. Priority circuitry 280 compares the priorities of the remaining error events identified as potentially related to the trigger error event and the priority of the trigger error event. In many embodiments, one error event has the highest priority and the remaining error events are marked as "processed."

In other embodiments, when more than one error event have the same and highest priority, one or more of the error identifier codes of the remaining error events may indicate that the error events do not require repair actions like the normal power off. Otherwise, the remaining error events may be marked as "call home candidates."

After, one or more error events are selected by event selector 260 and marked as a "call home candidate" the error event(s) may be transmitted to the maintenance provider to initiate a repair action for the error.

Referring now to FIGS. 3 and 4, there is shown an embodiment of a topology data structure to store the topology of a cluster. In the present embodiment, CEC Index Structure 300 of FIG. 3 is a starting point for entering the relationship data structure described in FIG. 4. For instance, when an error event reports an error with a loop number, the entries in CEC Index Structure 300 for the system are located and the connection between the system and the loop of the error event can be verified if an entry for the system includes the same loop number as the loop number in the error event. In particular, FIG. 3 depicts the CEC Index Structure 300. CEC Index Structure 300 may comprise loop data to describe loops coupled with a system, or central electronic complex (CEC). CEC Index Structure 300 includes a row for each loop of a system and a set of rows for each system in a cluster to describe loops associated with each system. Starting from the leftmost column, CEC index structure 300 includes a "CEC MTMS" column. The "CEC MTMS" column includes loop data to describe a system, e.g., the MTMS for the system. The number of loops of the cluster that couple with the system determines the number of rows with the same MTMS.

The "loop number" column has loop data that describes the loop designation for a loop coupled with the MTMS of the same row. In many embodiments, the loop designation is based upon the port number of the NIC card with which the loop is coupled. The "I/O units on loop" column may include loop data that describes the loop such as a port number and MTMS of another system with which the loop is directly coupled.

The "loop sibling" includes a loop designation for a sibling loop coupled to the same NIC as the loop described on the same row. In other embodiments, the "loop sibling" column is not included in this structure but is included in a second data structure like loop node model 400 in FIG. 4. And the "pointer to loop model node" column includes a pointer to associate the loop described on the row with an entry in a data structure like the loop node model 400 in FIG. 4.

FIG. 4 depicts a loop node model 400. Loop node model 400 may include pointers to describe interconnections, e.g., loops, and relationships between systems, such as sibling loops, allowing an error event correlation algorithm to determine the loops that are shared by systems of a cluster, the adjacency of the systems in a loop of the cluster, and sibling loop relationships on a per system basis. In particular, loop node model 400, starting from the leftmost column, includes a "CEC MTMS" column. The "CEC MTMS" column includes loop data to describe a system, e.g., the MTMS for the system. The number of loops of the cluster that couple with the system determines the number of rows with the same MTMS.

The "loop number" column describes the loop designation for a loop coupled with the MTMS of the same row. The "loop sibling" includes a loop designation for a sibling loop coupled to the same NIC as the loop described on the same row.

The "link to loop node from even CEC port" and the "link to loop node from odd CEC port" columns include pointers to entries for the subsequent and previous systems, respectively, interconnected with the loop described in the same row. For example, a loop may couple an even port of a first system to an odd port of the second system. The even port of the second system may couple with an odd port of a third system and the even port of the third system may couple with the odd port of the first system. Thus, in an entry for this loop for the first system, the "link to loop node from even CEC port" column includes a pointer to the entry for the loop for the second system. And, in the entry for this loop for the first system, the "link to loop node from odd CEC port" column includes a pointer to the entry for the loop for the third system. Similarly, the entry for the second system includes pointers to the second system and the first system and the entry for the third system includes pointers to the first system and the second system in the columns "link to loop node from even CEC port" and the "link to loop node from odd CEC port", respectively.

When accessing the data structure in loop node model 400, starting at the loop of the error event of interest, the loop can be traversed from the system associated with the error event around the loop to each system coupled with the loop and back to the system associated with the error event. In embodiments wherein the loop number is based upon the port coupled with the loop, port numbers of each loop connection may be determined from loop node model 400.

Figure 5:
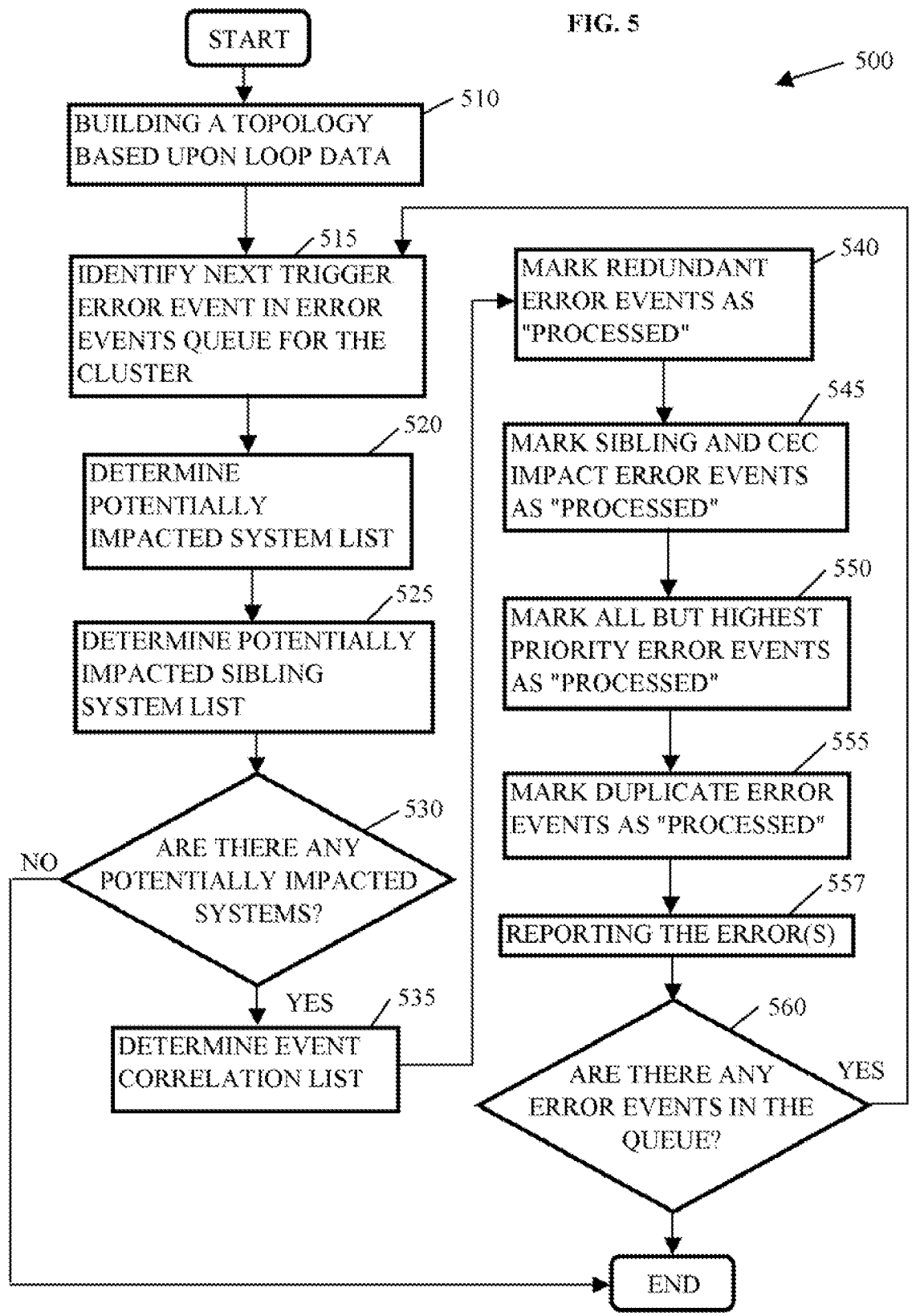
FIG. 5 depicts an embodiment of a method for correlating error events associated with the cluster.

FIG. 5 depicts an example flow chart 500 of a method for correlating error events of a cluster. Flow chart 500 begins with element 510, building a topology based upon loop data. Element 510 may involve obtaining loop data from the systems of the cluster to describe an interconnection between the systems and the cluster and determining the topology for the cluster based upon the loop data. For example, each system of the cluster includes cluster topology services that maintain knowledge of currently active cluster systems and partitioned clusters. Partitioned clusters include one or more nodes that have been disconnected from the cluster. Cluster topology services dynamically updates the topology of the cluster and element 510 periodically obtains loop data from cluster topology services of each system in the cluster to update an overall topology for the cluster in a data structure. The data structure may be maintained in an environment that is independent of the cluster.

Systems also forward error events to an error event queue in the independent environment and, upon receipt of error events, element 515 identifies the next trigger error event in an error events queue for the cluster. Element 515 may involve incrementing a pointer in an error events queue to determine a trigger error event. When an error event is selected and a latency window associated with the error event expires, the event is referred to as a trigger error event since it triggers an error event correlation process.

In further embodiments, element 515 also includes determining whether the next error event should be processed, or subjected to the error event correlation process. For example, the present embodiment marks error events as "processed" when the error events are related to an error described by another error event that has been selected as a "call home candidate." The "call home candidate" is reported to a customer and/or maintenance provider to represent the error while the error events marked as "processed" are determined to be related error events that need not be correlated further. Thus, element 515, upon identifying the next error event in the error event queue, determines whether the error event is marked "processed" or "call home candidate." When the error event is marked by either designation, element 515 increments the pointer again to check another error event. Upon identifying an error event that is not marked "processed" or "call home candidate," the error event is determined to be a trigger error event.

Upon identifying a trigger error event, element 520, the system and loop associated with the trigger error event are identified to determine a list of systems potentially impacted. For example, the system and loop may facilitate locating an entry representing the system and loop in a data structure for the overall topology of the cluster. The entry may be associated with pointers that point to entries for other systems and loops in the overall topology, indicating a relationship between the system and loop of the trigger error event and the other systems. Element 520 identifies a list of the related systems in accordance with the overall topology.

Element 525 may determine a list of systems on sibling loops that might be impacted by the error associated with the trigger error event. In particular, the entry for the system and loop in the data structure for the overall topology may include data and/or a pointer for sibling loop to describe another loop that couples with the same hub, or NIC. Element 525 searches through the topology of the sibling loop to determine other systems that couple with the sibling loop and add them to the potentially impacted sibling system list.

Further embodiments involve comparing the error associated with the trigger error event to a list of errors to determine whether the error would impact other systems. In such embodiments, the relationships used to build a list of potentially related systems are narrowed or broadened. For example, when the lists of errors associates the error with an error that does not cause an impact on other systems of the cluster, no systems may be added to the list of potentially impacted systems. On the other hand, when the list of errors associates the error of the trigger error event with an impact on sibling systems, element 525 may look to sibling loops identified in the overall topology to determine a potentially impacted sibling list.

Decision element 530 looks at the potentially impacted system list and sibling system list to determine whether either list includes systems other than the system associated with the trigger event. If not, then the correlation process is complete and ends by marking the trigger error event as a "call home candidate" or by forwarding the trigger error event to the maintenance provider.

On the other hand, when lists include systems potentially impacted, element 535 determines an event correlation list by identifying and adding error events in the error event queue that are associated with the potentially impacted systems and sibling systems. In some embodiments, element 535 identifies and adds to the list, error events associated with the same loop number as the trigger event, that were generated within a latency window associated with the trigger error event. For example, an error event associated with a system coupled with a sibling loop may not be added to the correlation list when the error event is associated with a hardware failure of the system on the sibling loop. However, an error event identified associated with a system coupled with a sibling loop may be added to the correlation list when the error event is associated with a communication failure for the sibling loop.

In element 540, redundant error events are marked as "processed." More specifically, element 540 involves identifying an error event in the correlation list that describes the error that is described by the trigger error event and is generated by the same system that generated the trigger error event.

Element 545 involves identifying sibling and CEC, or system, impact error events and marking these error events as "processed." For example, when a system has a catastrophic error that forces the system to shut down to avoid corrupting the system or data, the system may generate an error event. The abnormal shutdown of the system may be detected by all CECs coupled with the system including CECs on sibling loops. Thus, when that error event is the trigger error event, the error events generated by all CECs coupled with the system including CECs on sibling loops are marked as "processed."

Element 550 compares the errors identified by each error event on the correlation list including the trigger error event and identifies the error event with the highest priority. In many embodiments, a list of errors associated with priorities is provided with clustering software like heartbeat monitoring software. In other embodiments, the list may be obtained from one or more systems in the cluster.

In element 555, duplicate error events are marked as "processed." More specifically, element 555 involves identifying a duplicate error event in the correlation list that describes the error that is described by the trigger error event but is generated by a different system than the system that generated the trigger error event.

After the duplicate error events are removed, the remaining error event may be marked as "call home candidates." Element 557, reporting the error(s), may involve removing the "processed" and "call home candidate" error events from the error event queue by forwarding the "call home candidate" error events to the maintenance provider and clearing the "processed" error events.

Element 560 determines whether more error events reside in the error event queue that have not been marked as "processed" or "call home candidates." When there are more error events in the queue to be processed then the correlation process begins again at element 510. Otherwise the process ends until one or more error events are received by the error event queue.

One embodiment of the invention is implemented as a program product for use with a computer system such as, for example, the system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

While the foregoing is directed to embodiments of the present invention, other and further embodiments of the invention may be devised without departing from the basic scope thereof, and the scope thereof is determined by the claims that follow.

What is claimed is:

1. A method for correlating error events of a cluster, the method comprising:

configuring one or more processors to perform an operation, comprising:

identifying systems of the cluster potentially impacted by an error based upon a topology of the cluster, wherein a first system of the systems of the cluster includes two ports for communicating with other systems of the cluster, wherein the topology of the cluster comprises loop data describing a loop including the first system and a second system in the systems of the cluster via the two ports, wherein identifying the systems of the cluster further comprises identifying the systems coupled with sibling loops of the cluster;

identifying, from the error events, an error event associated with the first system; and selecting the error event based upon error identification data associated with the error event, wherein selecting the error event comprises comparing the error identification data with the loop data to identify an error in the loop including the first system and the second system in the systems of the cluster, to report the error to a maintenance provider.

2. The method of claim 1, further comprising:

obtaining the loop data from the systems of the cluster to describe an interconnection between the systems and the cluster; and determining the topology for the cluster based upon the loop data.

3. The method of claim 2, wherein obtaining loop data comprises receiving a loop designation assigned by a first system of the systems to identify the loop of the cluster and a system designation to identify a second system of the systems coupled with the loop.

4. The method of claim 3, wherein determining the topology comprises storing the loop data in a data structure to associate the loop designation with a second loop designation for the loop, wherein the second loop designation is associated with the loop based upon loop data received from the second system.

5. The method of claim 1, further comprising forwarding the error events from the systems of the cluster to an environment substantially independent of the cluster to correlate the error events.

6. The method of claim 1, wherein identifying the error event comprises identifying error events that associate the loop with a source of the error, the loop being associated with the error event.

7. The method of claim 1, wherein identifying the error event comprises identifying error events received within a time period of receipt of the error event.

8. The method of claim 1, wherein selecting the error event comprises identifying a second error event of the error events having error identification data associated with a lower priority than a priority for the error identification data associated with the error event.

9. The method of claim 1, further comprising:

provided a dedicated connection between a hardware management console and at least one of the systems of the cluster, wherein each of the error events is transmitted to the hardware management console via the dedicated connection.

* * * * *